United States Patent
Utsunomiya et al.

(10) Patent No.: US 11,565,548 B2
(45) Date of Patent: Jan. 31, 2023

(54) HUB UNIT HAVING STEERING FUNCTION, AND VEHICLE PROVIDED WITH SAID HUB UNIT

(71) Applicant: NTN CORPORATION, Osaka (JP)

(72) Inventors: Satoshi Utsunomiya, Iwata (JP); Hirokazu Ooba, Iwata (JP); Yusuke Ohata, Iwata (JP)

(73) Assignee: NTN CORPORATION, Osaka (JP)

( * ) Notice: Subject to any disclaimer, the term of this patent is extended or adjusted under 35 U.S.C. 154(b) by 322 days.

(21) Appl. No.: 16/883,321

(22) Filed: May 26, 2020

(65) Prior Publication Data
US 2020/0282769 A1    Sep. 10, 2020

Related U.S. Application Data

(63) Continuation of application No. PCT/JP2018/043639, filed on Nov. 27, 2018.

(30) Foreign Application Priority Data

Nov. 28, 2017    (JP) .............................. JP2017-227604

(51) Int. Cl.
*B60B 27/00*    (2006.01)
*B60B 27/02*    (2006.01)
(Continued)

(52) U.S. Cl.
CPC ...... *B60B 27/0078* (2013.01); *B60B 27/0094* (2013.01); *B60B 27/02* (2013.01);
(Continued)

(58) Field of Classification Search
CPC . B60B 27/0078; B60B 27/0094; B60B 27/02; B62D 5/0418; B62D 5/0421; B62D 5/0463; B62D 7/1581; B62D 7/18
See application file for complete search history.

(56) References Cited

U.S. PATENT DOCUMENTS

| 5,538,273 A | 7/1996 | Osenbaugh et al. |
| 5,749,594 A * | 5/1998 | Krisher ................ B62D 17/00 280/124.1 |

(Continued)

FOREIGN PATENT DOCUMENTS

| CN | 1281407 A | 1/2001 |
| CN | 201484168 U | 5/2010 |

(Continued)

OTHER PUBLICATIONS

International Search Report dated Feb. 12, 2019, in corresponding International Patent Application No. PCT/JP2018/043639.

(Continued)

*Primary Examiner* — Tony H Winner (57) ABSTRACT

Provided is a turning function-equipped having a reduced size and having improved strength to an external shock force and improved reliability. The turning function-equipped hub unit includes: a hub unit main body; a unit support member; and a turning actuator. The unit support member is provided to a chassis frame component. The unit support member includes an abutment part with which a part of the hub unit main body is brought into abutment in a vertical direction during non-normal time, the abutment part being separated from the hub unit main body in the vertical direction during normal time, and the non-normal time in which the abutment is caused, is a time when an impact load equal to or greater than a predetermined value acts on the hub unit main body in the vertical direction due to an external force from the wheel.

6 Claims, 9 Drawing Sheets

(51) Int. Cl.
*B62D 5/04* (2006.01)
*B62D 7/15* (2006.01)
*B62D 7/18* (2006.01)

(52) U.S. Cl.
CPC ......... *B62D 5/0418* (2013.01); *B62D 5/0463* (2013.01); *B62D 7/1581* (2013.01); *B62D 7/18* (2013.01)

(56) References Cited

U.S. PATENT DOCUMENTS

| | | | |
|---|---|---|---|
| 6,116,626 | A | 9/2000 | Cherry et al. |
| 6,776,426 | B2 | 8/2004 | Deal |
| 7,866,434 | B2 * | 1/2011 | Shiino ............ B62D 7/08 280/93.512 |
| 8,382,156 | B2 | 2/2013 | Akutsu et al. |
| 10,668,950 | B2 * | 6/2020 | Kurita ............ F16D 3/223 |
| 11,097,768 | B2 * | 8/2021 | Ooba ............ B62D 5/0427 |
| 2002/0036385 | A1 | 3/2002 | Mackie et al. |
| 2002/0171216 | A1 | 11/2002 | Deal |
| 2006/0266574 | A1 | 11/2006 | Lundmark |
| 2007/0131474 | A1 | 6/2007 | Zetterstroem |
| 2009/0261550 | A1 | 10/2009 | Siebeneick |
| 2011/0135233 | A1 | 6/2011 | Sutherlin et al. |
| 2012/0193902 | A1 | 8/2012 | Akutsu et al. |

FOREIGN PATENT DOCUMENTS

| | | |
|---|---|---|
| CN | 104742966 A | 7/2015 |
| CN | 106335542 A | 1/2017 |
| DE | 20314649 U1 | 12/2003 |
| DE | 10 2012 206 337 A1 | 10/2013 |
| EP | 1 669 275 A | 6/2006 |
| EP | 2465751 A1 | 6/2012 |
| JP | 1-190586 A | 7/1989 |
| JP | 5-124535 A | 5/1993 |
| JP | 6-183365 A | 7/1994 |
| JP | 2003-2024 A | 1/2003 |
| JP | 2007-271055 A | 10/2007 |
| JP | 2008-260355 A | 10/2008 |
| JP | 2009-226972 A | 10/2009 |
| JP | 4444291 B2 | 3/2010 |
| JP | 2012-121391 A | 6/2012 |
| JP | 2013-50160 A | 3/2013 |
| JP | 2014-61744 A | 4/2014 |
| JP | 2017-7633 A | 1/2017 |
| JP | 2017-133573 A | 8/2017 |
| WO | WO 99/30956 | 6/1999 |

OTHER PUBLICATIONS

Decision to Grant a Patent dated Jul. 2, 2019, in corresponding Japanese Patent Application No. 2017-22760.
Japanese Office Action dated Jun. 2, 2020, in related Japanese Patent Application No. 2019-140528.
International Preliminary Report on Patentability dated Jun. 2, 2020, in corresponding International Patent Application No. PCT/JP2018/043639.
Supplementary European Search Report for European Application No. 18 88 3576 dated Jun. 28, 2021.
First Office Action dated Nov. 26, 2021 in Chinese Patent Application No. 201880076361.0.

* cited by examiner

PRIOR ART

HUB UNIT HAVING STEERING FUNCTION, AND VEHICLE PROVIDED WITH SAID HUB UNIT

CROSS REFERENCE TO THE RELATED APPLICATION

This application is a continuation application, under 35 U.S.C. § 111(a), of international application No. PCT/JP2018/043639, filed Nov. 27, 2018, which claims priority to Japanese patent application No. 2017-227604, filed Nov. 28, 2017, the entire disclosures of all of which are herein incorporated by reference as a part of this application.

BACKGROUND OF THE INVENTION

Field of the Invention

The present invention relates to a turning function-equipped hub unit having a function for performing supplementary turning (such as turning additional to turning performed by a steering device, or rear-wheel turning or the like), to a vehicle including the same, as well as to a technique of improving fuel economy as well as enhancing travel stability and reliability of a vehicle.

Description of Related Art

General vehicles (such as automobiles) include a steering wheel mechanically connected to a steering device, the steering device having two ends connected to left and right wheels through tie rods. Therefore, a turning angle of each of the left and right wheels is determined by an operation of the steering wheel in accordance with an initial setting. Known vehicle geometries include: (1) "parallel geometry" in which left and right wheels have the same turning angle; and (2) "Ackermann geometry" in which a wheel turning angle of an inner wheel is made larger than a wheel turning angle of an outer wheel so as to have a single center of turning.

The vehicle geometries influence travel stability and reliability. For example, Patent Documents 1 and 2 propose mechanisms that allow the steering geometries to be changed in accordance with travel conditions. In Patent Document 1, positions of a knuckle arm and a joint part are relatively changed so as to change the steering geometries. In Patent Document 2, two motors are used to allow both of a toe angle and a camber angle to be changed to arbitrary angles. Further, Patent Document 3 proposes a mechanism for four-wheel independent turning.

RELATED DOCUMENT

Patent Document

[Patent Document 1] JP Laid-open Patent Publication No. 2009-226972
[Patent Document 2] DE 102012206337 A
[Patent Document 3] JP Laid-open Patent Publication No. 2014-061744

SUMMARY OF THE INVENTION

In Ackermann geometry, a difference in turning angles of left and right wheels is set so that the respective wheels turn about a single common point in order to smoothly turn the wheels when a vehicle turns in a low-speed range where a centrifugal force acting on the vehicle is negligible. In contrast, when a vehicle turns in a high-speed range where a centrifugal force is not negligible, parallel geometry is preferred to Ackermann geometry, since it is desirable that the wheels generate a cornering force in a direction for counterbalancing the centrifugal force.

As mentioned above, since a turning device of a general vehicle is mechanically connected to wheels, the vehicle can usually assume only a single fixed steering geometry and is often configured in an intermediate geometry between Ackermann geometry and parallel geometry. In such a case, however, the turning angle of the outer wheel becomes excessively large in a low-speed range due to an insufficient difference in turning angles of the left and right wheels, whereas the turning angle of the inner wheel becomes excessively large in a high-speed range. Thus, where distribution of wheel stress is unnecessarily unbalanced between inner and outer wheels, travel resistance may be deteriorated, causing worsening of fuel economy and early wear of a tire. Further, there is another problem that the inner and outer wheels cannot be effectively used, causing deterioration in smooth cornering.

Although the steering geometries can be changed as proposed by Patent Documents 1, 2, there are the following problems. In Patent Document 1, although positions of a knuckle arm and a joint part are relatively changed in order to change the steering geometries as described above, it is extremely difficult to provide a motor actuator that can provide such a large force that the vehicle geometries can be changed in such parts, due to space constraints. In addition, since a change made at this location would only cause a small change in the tire angles, it is necessary to cause a large change, that is, a large movement in order to obtain a large effect.

In Patent Document 2, use of two motors results in increase in costs because of the increased number of the motors, and the control is complicated. Patent Document 3 can only be applied to four-wheel independent turning vehicles. Also, in Patent Document 3, a hub bearing is supported in a cantilever manner with respect to a turning shaft, resulting in reduced rigidity, and a steering geometry could be changed due to generation of excessive travel acceleration. Further, where a speed reducer is provided on a turning shaft, large power is required. Therefore, a large motor is provided, which in turn makes it difficult to dispose the entire motor in an inner peripheral part of a wheel. Also, where a speed reducer having a large speed reduction ratio is provided, responsiveness would be deteriorated.

Since a mechanism having a conventional supplementary turning function as described above is intended to arbitrarily change a toe angle or a camber angle of a wheel in a vehicle, the mechanism has a complicated configuration. Also, it is difficult to ensure rigidity, and the mechanism needs to be made larger in order to ensure rigidity, resulting in an increased weight.

Figure 10:
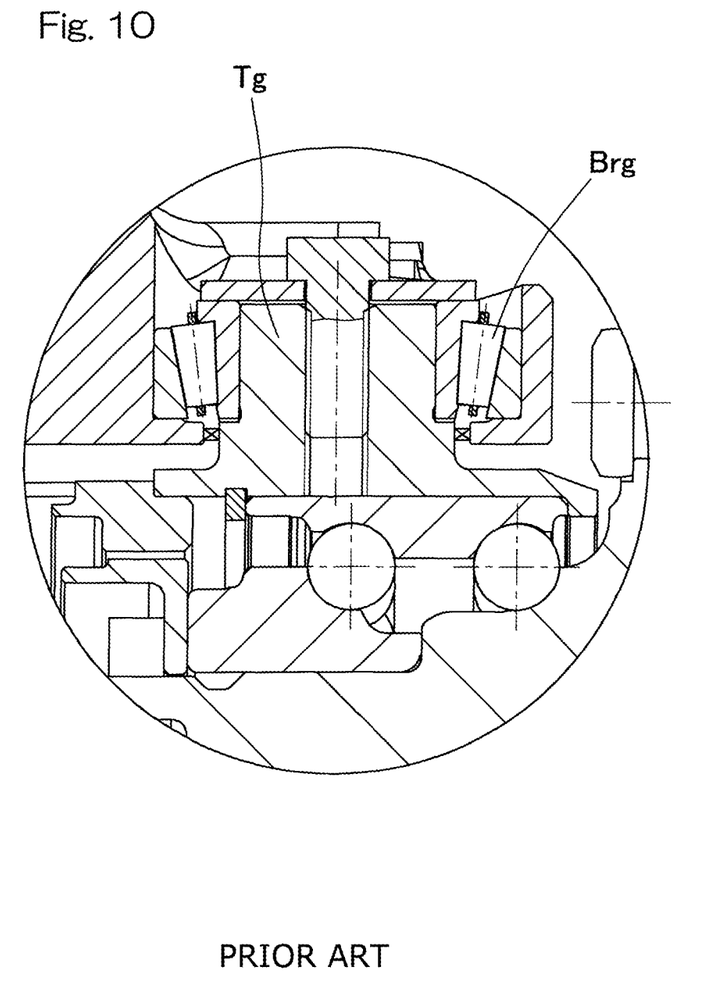
FIG. 10 is an enlarged section view of a turning shaft part and the like of a conventional hub unit.

In order to arbitrarily change a toe angle or a camber angle of a wheel in a vehicle, a complicated configuration is needed, resulting in an increased number of constituting components. Although a mechanism (hub unit) having a turning function is required to have a compact configuration in order to be disposed in a limited space within a wheel, this may possibly lead to insufficient strength of components. In particular, since a turning shaft and a support bearing for the turning shaft, which receive an excessive impact force from the road surface, are most susceptible parts, it is difficult to ensure strength and reliability. Specifically, as shown in FIG. 10, downsizing of a hub unit results in reduction in size of a turning shaft Tg and a support bearing Brg for the turning shaft. Thus, where an excessive external force from the road surface acts on the hub unit in an impulse-like manner, abnormality may occur in the turning shaft Tg or the support bearing Brg, possibly degrading the turning function.

An object of the present invention is to provide a turning function-equipped hub unit and a vehicle including the same, the turning function-equipped hub unit having a reduced size and having improved strength to an external shock force and improved reliability.

A turning function-equipped hub unit of the present invention includes: a hub unit main body including a hub bearing configured to support a wheel; a unit support member configured to be provided to a chassis frame component of a suspension device, the unit support member supporting the hub unit main body so as to be rotatable about a turning axis extending in a vertical direction; and a turning actuator configured to rotationally drive the hub unit main body about the turning axis, wherein the unit support member includes an abutment part configured such that a part of the hub unit main body is brought into abutment with the abutment part in the vertical direction during non-normal time, the non-normal time in which the abutment is caused being defined as a time when an impact load equal to or greater than a predetermined value acts on the hub unit main body in the vertical direction due to an external force from the wheel, and the abutment part is separated from the hub unit main body in the vertical direction during normal time. The impact load equal to or greater than a predetermined value may be any impact load arbitrarily defined in accordance with designs or the like and, for example, may be defined by calculating an appropriate impact load by one or both of testing and simulation.

The following are examples of a time when an impact load equal to or greater than a predetermined value acts on the hub unit main body in the vertical direction due to an external force from the wheel:

(1) when a wheel hits an object on the road (e.g., when a vehicle drives up a curbstone during normal travel); and (2) when a damping device of a vehicle cannot absorb a force acting on a ground contact surface of a tire of a wheel in a transverse direction to a direction of vehicle travel during turning of the vehicle. This is because, in this case, the force is more likely to be transferred as a larger moment force to the hub unit.

According to this configuration, the hub unit main body including the hub bearing for supporting the wheel can be freely rotated about the turning axis by driving the turning actuator. Therefore, it is possible to independently turn each wheel and to arbitrarily change a toe angle of the wheel in accordance with travel conditions of the vehicle. For this reason, the hub units may be used in either turning wheels (such as front wheels) or non-turning wheels (such as rear wheels). Where the hub units are used in turning wheels, each hub unit is disposed in a component whose direction is changed by the steering device such that the hub unit serves as a mechanism for causing a minute change in the angle of the wheel to move the left and right wheels in an independent manner or in an interlocking manner, in addition to turning in accordance with an operation of the steering wheel by a driver.

Also, it is possible to vary a difference in turning angles of left and right wheels in accordance with a travel speed in turning. For example, it is possible to change the steering geometries while driving so as to assume parallel geometry when turning in a high-speed range and Ackermann geometry when turning in a low-speed range. Thus, since the wheel angles can be arbitrarily changed while driving, it is possible to improve motion performance of a vehicle and to drive stably and more reliably. Further, it is possible to reduce a turning radius of a vehicle to enhance small-turn performance by appropriately changing turning angles of the left and right turning wheels when turning. Furthermore, it is possible to make adjustments to ensure travel stability, without deteriorating fuel economy, by adjusting the magnitude of a toe angle according to circumstances even when a vehicle is traveling linearly.

In order to control a behavior of a vehicle this way, it is necessary to precisely control a turning angle of a wheel, and it is necessary to reduce the size of the hub unit so that it can be disposed in a limited space within the wheel and to enhance rigidity of the entire hub unit. Reduction of the size of the hub unit, however, leads to reduction of the size of a turning shaft and a bearing for supporting the turning shaft. Thus, where an excessive external force from the road surface acts on the hub unit in an impulse-like manner, abnormality may occur in the turning shaft or the bearing for supporting the turning shaft, possibly losing the turning function.

Where an excessive external force from the road surface acts on the hub unit in an impulse-like manner, large stress may occur to base parts of the upper and lower turning shafts, possibly causing deformation and the like. Where an impact force acts on the bearings for supporting the turning shafts, indentation may occur to a bearing raceway surface and thus inhibit smooth rotation, which may degrade the turning function. The "external shock force" is generated when a tire or a wheel body hits an object on the road surface (e.g., when a vehicle drives up a curbstone during normal travel) or when a vehicle takes an excessively steep turn. In particular, a force acting on a ground contact surface of a tire in a transverse direction to a direction of vehicle travel cannot be absorbed by a damping device of a vehicle. Therefore, such a force is more likely to be transferred as a larger moment force to the hub unit.

According to this configuration, during normal time, the abutment part of the unit support member is separated from the hub unit main body in the vertical direction, and thus does not inhibit rotation (i.e. turning function) about the turning axis of the hub unit main body. During non-normal time when an impact load equal to or greater than a predetermined value acts on the hub unit main body in the vertical direction due to an external force from the wheel, a part of the hub unit main body is brought into direct abutment with the abutment part of the unit support member in the vertical direction, so as to temporarily stop the turning function and receive the excessive external force on the abutment part. This makes it possible suppress generation of an excessive stress to the turning shafts so as to prevent abnormality, such as deformation, from occurring to the turning shafts. It is also possible to prevent indentation from occurring on raceway surfaces of the bearings for supporting the turning shafts in advance to maintain a good turning function during normal time. Therefore, it is possible to reduce the size of the turning function-equipped hub unit without making it excessively large.

The part of the hub unit main body may form a to-be-contacted surface configured to be brought into surface contact with a contact surface of the abutment part. In this way, it is possible to more reliably suppress concentration of stress on the unit support member and the hub unit main body by bringing the abutment part and the part of the hub unit main body into surface contact with each other.

The hub unit may include a rotation allowing support component configured to allow the hub unit main body to rotate about the turning axis with respect to the unit support member. The rotation allowing support component may be a rolling bearing or the like.

The hub unit main body may include an outer ring including: an annular part fixed to an outer peripheral surface of an outer race that is a stationary ring of the hub bearing; and attachment shaft parts protruding upward and downward from an outer periphery of the annular part, each of the attachment shaft parts being attached with the rotation allowing support component, and the annular part of the outer ring is the part of the hub unit main body which is configured to be brought into abutment with the abutment part. In this case, even where an excessive external force from the road surface acts on the hub bearing in an impulse-like manner, the abutment part of the unit support member and the annular part of the outer ring can come into direct abutment so as to suppress generation of excessive stress to the shaft parts of the turning shafts. This also prevents a load equal to or greater than a predetermined amount from acting on the bearings for supporting the turning shafts so as to protect the turning shafts and the bearings.

A turning system of the present invention includes: a turning function-equipped hub unit according to any one of the above configurations of the present invention; and a controller configured to control a turning actuator of the turning function-equipped hub unit, wherein the controller includes a control section configured to output a current command signal in accordance with a given turning angle command signal and an actuator drive and control section configured to output current in accordance with the current command signal inputted from the control section to drive and control the turning actuator.

According to this configuration, the control section outputs a current command signal in accordance with a given turning angle command signal. The actuator drive and control section outputs current in accordance with the current command signal, which is input from the control section, to drive and control the turning actuator. Therefore, the wheel angle can be arbitrarily changed in addition to turning in accordance with an operation of the steering wheel by a driver.

A vehicle of the present invention includes turning function-equipped hub units according to any one of the above configurations of the present invention, wherein the turning function-equipped hub units support one or both of front wheels and rear wheels. Therefore, the effects described above for the turning function-equipped hub unit of the present invention can be obtained. Where turning function-equipped hub units of the present invention are applied to front wheels which usually serve as turning wheels, toe angles can be effectively adjusted during driving. Where the hub units are applied to rear wheels which usually serve as non-turning wheels, slight turning of the non-turning wheels makes it possible to reduce the minimum rotation radius during driving at low speed.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views. In the figures.

DESCRIPTION OF THE EMBODIMENTS

First Embodiment

A turning function-equipped hub unit according to a first embodiment of the present invention will be described with reference to FIG. 1 to 8.

Schematic Structure of Supplemental Turning Function-Equipped Hub Unit

Figure 1:
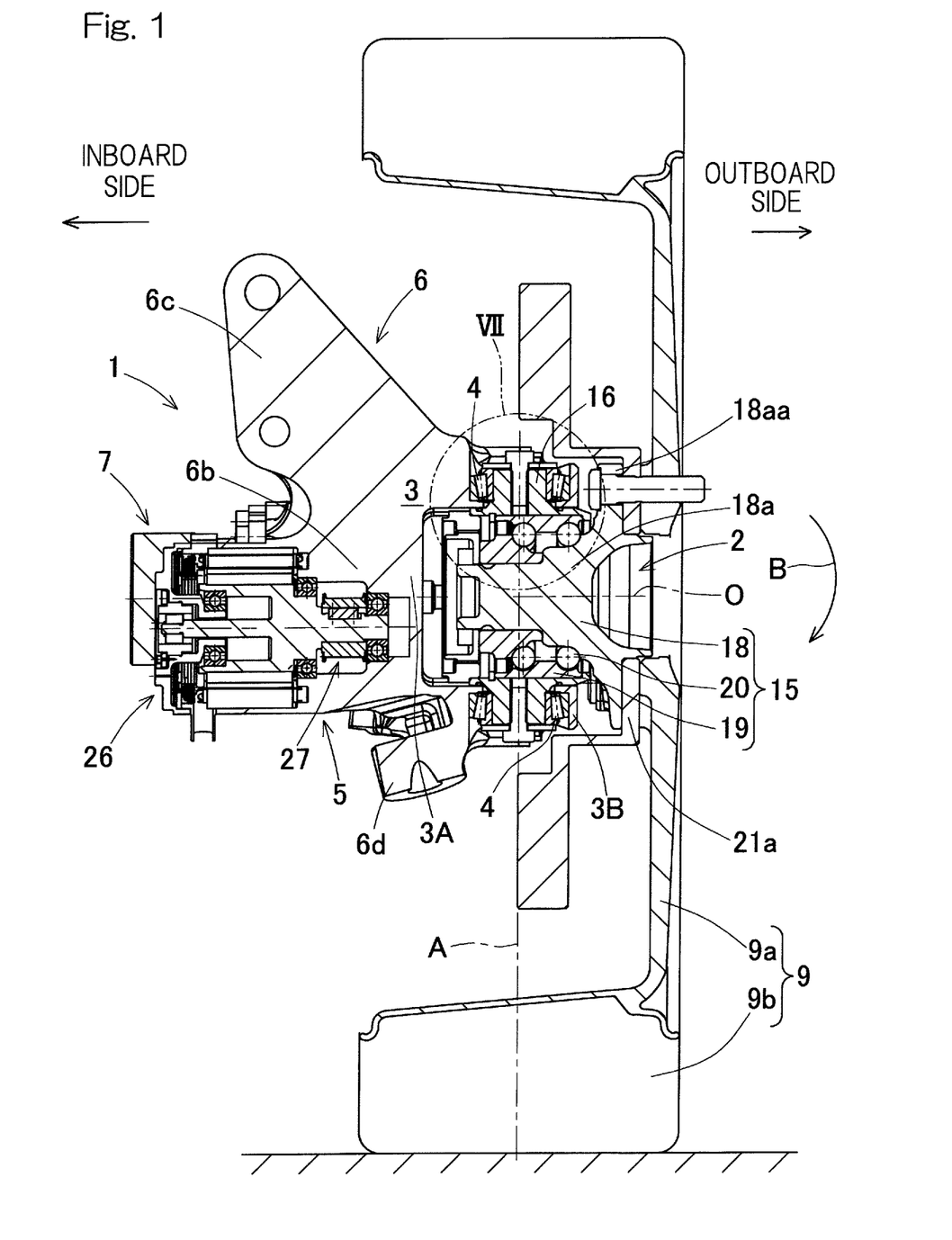
FIG. 1 is a longitudinal section view of a turning function-equipped hub unit according to a first embodiment of the present invention and surrounding features.

As shown in FIG. 1, a turning function-equipped hub unit 1 includes a hub unit main body 2, a unit support member 3, rotation allowing support components 4, and a turning actuator 5. The unit support member 3 is integrally provided to a knuckle 6 that is a chassis frame component. The turning actuator 5 includes an actuator main body 7 on an inboard side of the unit support member 3, and the hub unit main body 2 is provided on an outboard side of the unit support member 3. The term "outboard side" refers to an outer side of a widthwise direction of a vehicle in a state where the turning function-equipped hub unit 1 is mounted in the vehicle, and the term "inboard side" refers to an inner side of the widthwise direction of the vehicle.

Figure 2:
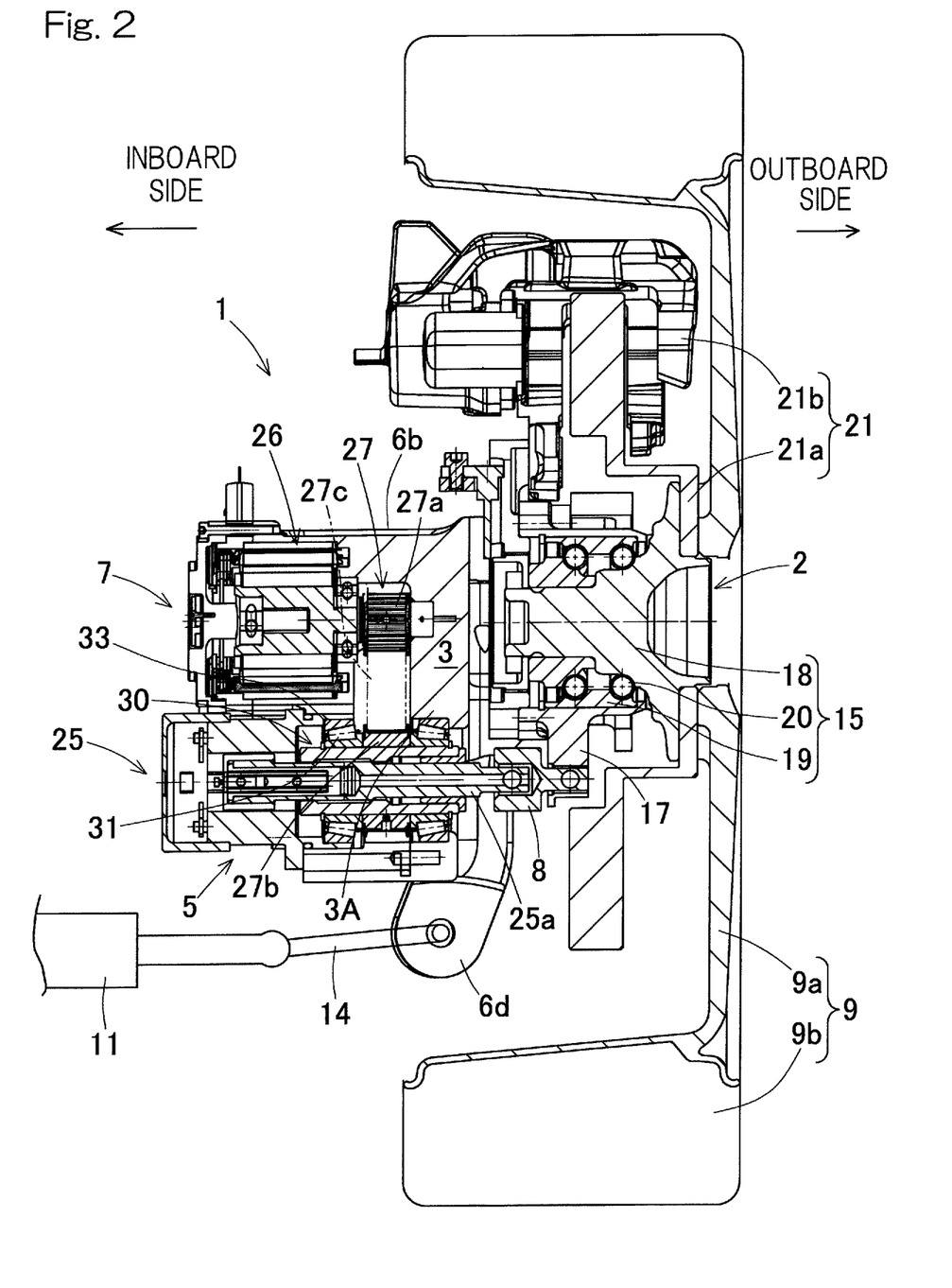
FIG. 2 is a horizontal section view of the turning function-equipped hub unit and the surrounding features.
Figure 3:
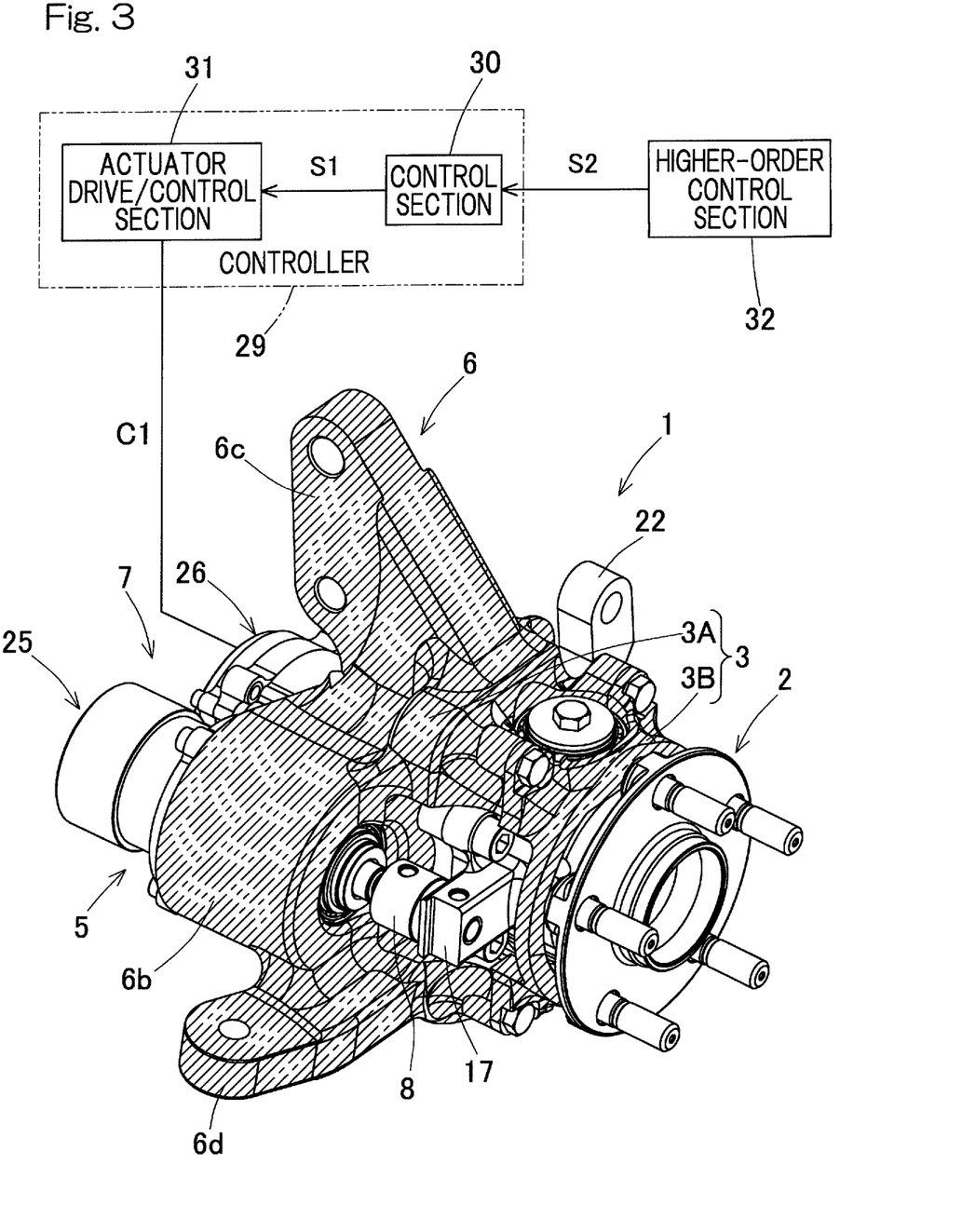
FIG. 3 is a perspective view illustrating an external appearance of the turning function-equipped hub unit.
Figure 4:
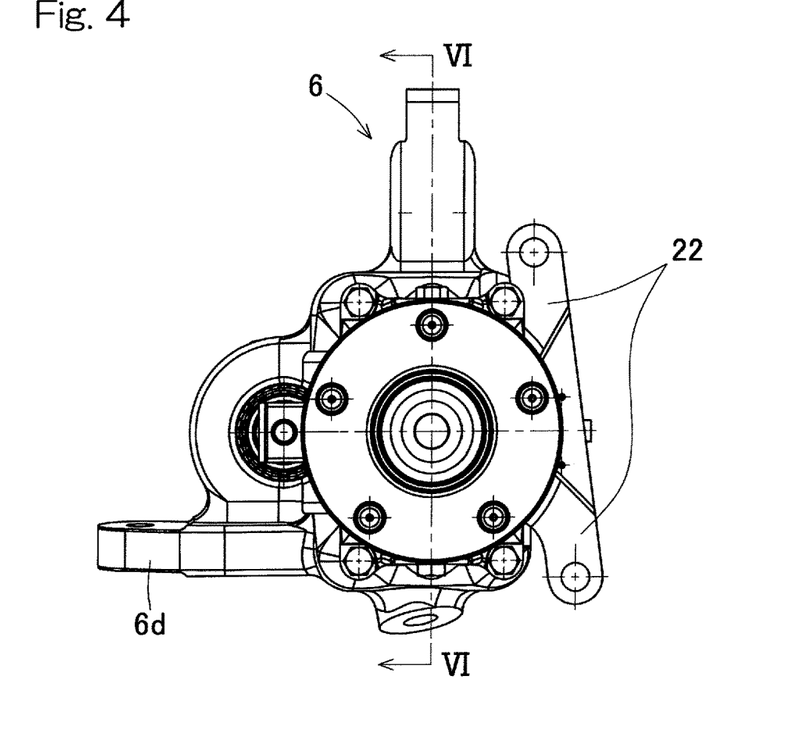
FIG. 4 is a side view of the turning function-equipped hub unit.

As shown in FIGS. 2 and 3, the hub unit main body 2 and the actuator main body 7 are coupled by a joint part 8. The joint part 8 is typically attached with a non-illustrated boot for protection against water and dust.

As shown in FIG. 1, the hub unit main body 2 is supported by the unit support member 3 via rotation allowing support components 4, 4 provided above and below the hub unit main body so as to be rotatable about a turning axis A extending in a vertical direction. The turning axis A is different from a rotation axis O of a wheel 9 and from a king pin axis about which main steering is performed. A typical vehicle has a king pin angle in a range from 10 to 20 degrees in order to improve linear motion stability of vehicle travel. In this embodiment, the supplemental turning function-equipped hub unit 1 has a turning axis having a different angle (axis) from the king pin angle. The wheel 9 includes a wheel body 9a and a tire 9b.

Installation Position of Turning Function-Equipped Hub Unit 1

Figure 9:
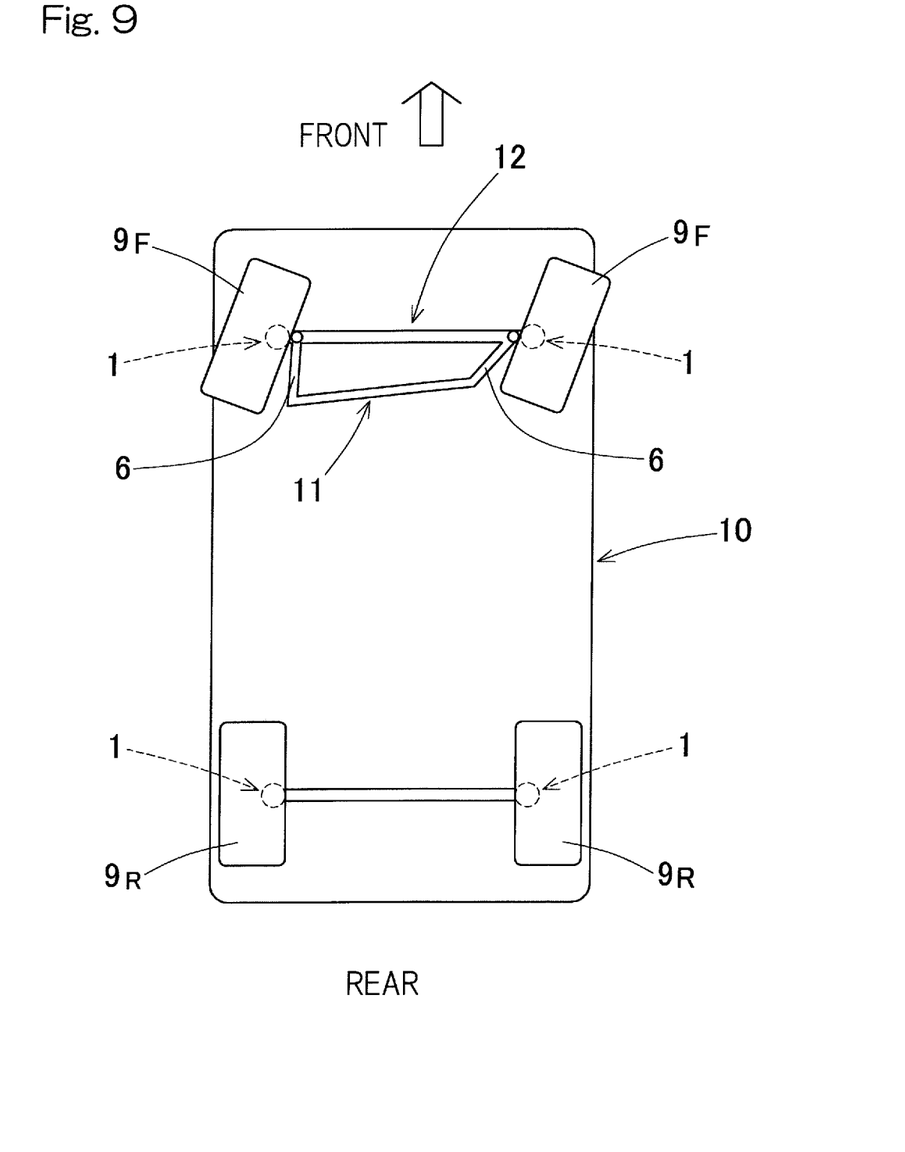
FIG. 9 is a schematic plan view of an example of a vehicle including a turning function-equipped hub unit of an embodiment.

The turning function-equipped hub unit 1 is, in this embodiment, a mechanism configured to perform individual turning of each of left and right wheels by a minute angle (about ±5 deg), in addition to the turning by a steering device 11 for turning wheels (specifically, front wheels 9F of a vehicle 10 as shown in FIG. 9), and is integrally provided to the knuckle 6 of the suspension device 12.

As shown in FIG. 2, the steering device 11 turns the wheel 9 in accordance with an operation of a steering wheel (not illustrated). FIG. 2 shows a chassis structure when viewed from above. The turning function-equipped hub unit 1 has a steering joint part 6d (which will be described later) to which a typical vehicle steering device 11 is connected through tie rods 14 such that the wheel 9 can be turned in accordance with an operation of the steering wheel by a driver. In addition, the turning function-equipped hub unit 1 may be used as a mechanism for performing turning of a rear wheel 9R (FIG. 9), supplementarily to front wheel turning. The suspension device 12 (FIG. 9) may be any of a strut type suspension mechanism, a multi-link type suspension mechanism, and suspension mechanisms of other types.

Hub Unit Main Body 2

Figure 6:
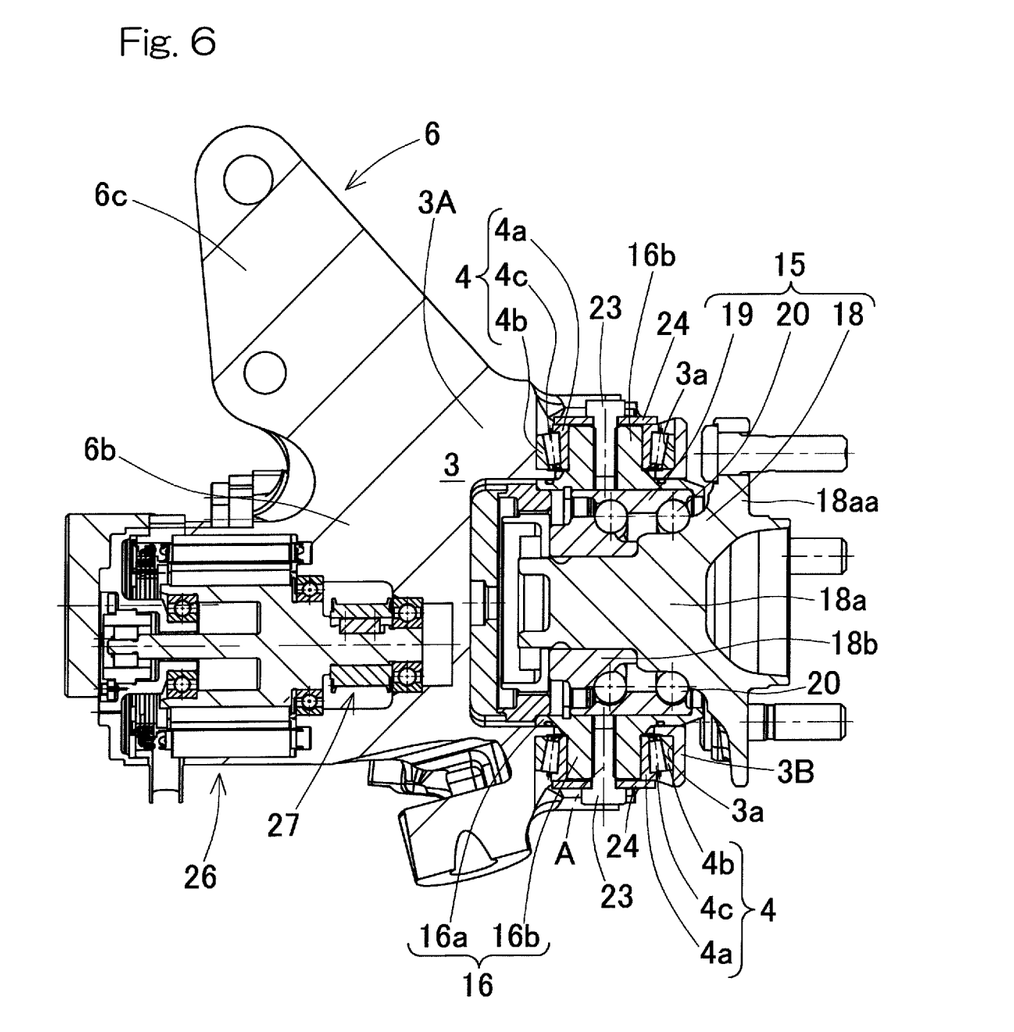
FIG. 6 is a section view along line VI-VI in FIG. 4.

As shown in FIG. 1, the hub unit main body 2 includes a hub bearing 15 for supporting the wheel 9, an outer ring 16, and a supplementary turning force receiving part 17 (FIG. 3) which will be described later. As shown in FIG. 6, the hub bearing 15 includes an inner race 18, an outer race 19, and rolling elements 20 (such as balls) interposed between the inner and outer races 18, 19 and couples the wheel 9 (FIG. 1) to a member on a vehicle body side.

In the illustrated example, the hub bearing 15 is an angular ball bearing including the outer race 19 as a stationary ring, the inner race 18 as a rotary ring, and the rolling elements 20 arranged in two rows. The inner race 18 includes: a hub axle part 18a having a hub flange 18aa and forming a raceway surface on the outboard side; and an inner race part 18b forming a raceway surface on the inboard side. As shown in FIG. 1, a wheel body 9a of the wheel 9 and a brake rotor 21a are fixed to the hub flange 18aa by bolts in an overlapping manner. The inner race 18 is configured to rotate about the rotation axis O.

As shown in FIG. 6, the outer ring 16 includes: an annular part 16a fitted to an outer peripheral surface of the outer race 19; and attachment shaft parts 16b, 16b each having a trunnion shaft shape, the attachment shaft parts being provided so as to protrude upward and downward from an outer periphery of the annular part 16a. Each of the attachment shaft parts 16b is provided so as to be coaxial with the turning axis A. As shown in FIG. 2, a brake 21 includes the brake rotor 21a and a brake caliper 21b. The brake caliper 21b is attached to brake caliper attachment parts 22 (FIG. 4) integrally formed with the outer race 19 so as to protrude in an arm-like manner at two upper and lower positions.

Rotation Allowing Support Component and Unit Support Member

As shown in FIG. 6, each of the rotation allowing support components 4 are constituted by a rolling bearing. In this example, a tapered roller bearing is used as the rolling bearing. The rolling bearing includes: an inner race 4a fitted to an outer periphery of the attachment shaft part 16b; an outer race 4b fitted to the unit support member 3 in a manner described later; and a plurality of rolling elements 4c interposed between the inner and outer races 4a, 4b.

The unit support member 3 includes a unit support member main body 3A and a unit support member joint body 3B. The unit support member joint body 3B having a substantially ring shape is removably fixed to an outboard side end of the unit support member main body 3A. The unit support member joint body 3B has an inboard side surface having upper and lower portions each formed with a fitting hole forming part 3a having a partially concaved spherical shape.

Figure 5:
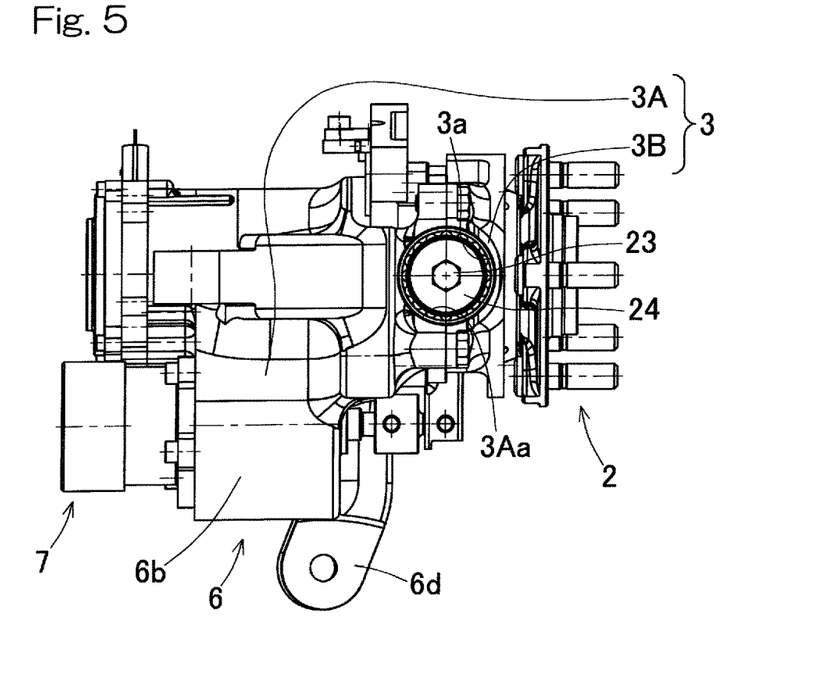
FIG. 5 is a plan view of the turning function-equipped hub unit.

As shown in FIGS. 5 and 6, the unit support member main body 3A has an outboard side end having upper and lower portions each formed with a fitting hole forming part 3Aa having a partially concaved spherical shape. As shown in FIG. 3, the unit support member joint body 3B is fixed to the outboard side end of the unit support member main body 3A such that the respective fitting hole forming parts 3a, 3Aa are put together in the upper and lower portions (FIG. 5) to define fitting holes each having a complete circumference. It should be noted that in FIG. 3, the unit support member 3 is indicated by chain lines. As shown in FIG. 6, the outer race 4b is fitted into the fitting hole.

Each of the attachment shaft parts 16b is formed with an internal thread portion extending in a radial direction, and a bolt 23 is screwed into the internal thread portion. Each of the rotation allowing support components 4 is preloaded by applying a pressing force to an end face of the inner race 4a by the bolt 23 screwed into the internal thread portion, with a pressing member 24 having a disk shape interposed on the end face of the inner race 4a. This makes it possible to improve rigidity of each of the rotation allowing support components 4. It should be noted that angular ball bearings or four-point contact ball bearings may be used instead of tapered roller bearings, as the rolling bearings serving as the rotation allowing support components 4. Even in such a case, preload can be applied in the same way as described above.

As shown in FIG. 2, the supplementary turning force receiving part 17 serves as a point of action at which a supplementary turning force is applied to the outer race 19 of the hub bearing 15, and is provided as a protruding arm part integrally provided with a part of the outer periphery of the outer race 19. The supplementary turning force receiving part 17 is rotatably coupled to a linear output part 25a of the turning actuator 5 through the joint part 8. This allows the linear output part 25a of the turning actuator 5 to advance/retreat so that the hub unit main body 2 is caused to rotate about the turning axis A (FIG. 1), i.e., to perform supplementary turning.

Peripheral Structure of Abutment Part

Figure 7:
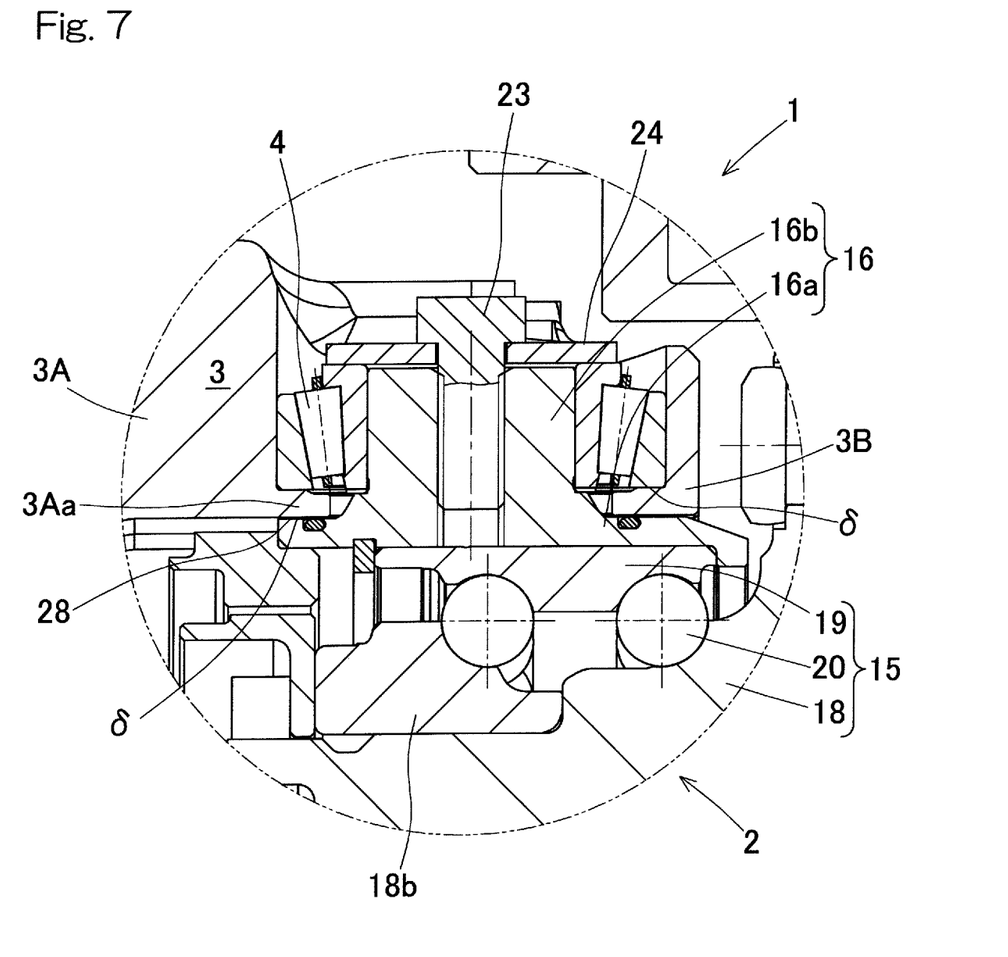
FIG. 7 is an enlarged section view of a turning shaft part and the like of the turning function-equipped hub unit.
Figure 8A:
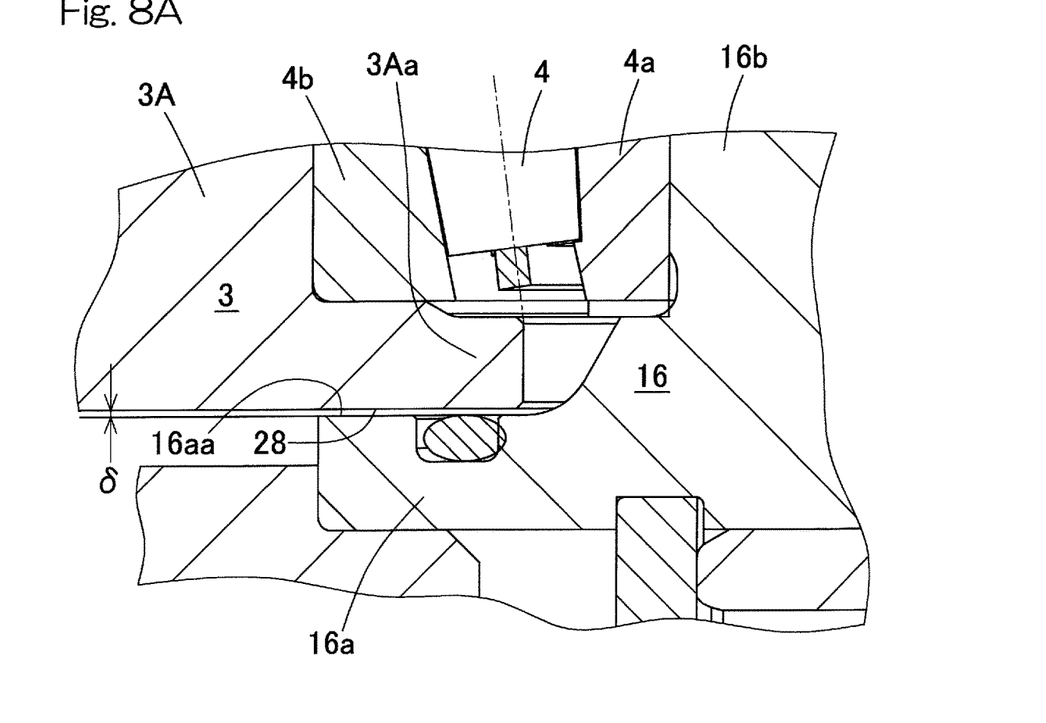
FIG. 8A is an enlarged section view of a periphery of an abutment part of the turning function-equipped hub unit during a normal time.
Figure 8B:
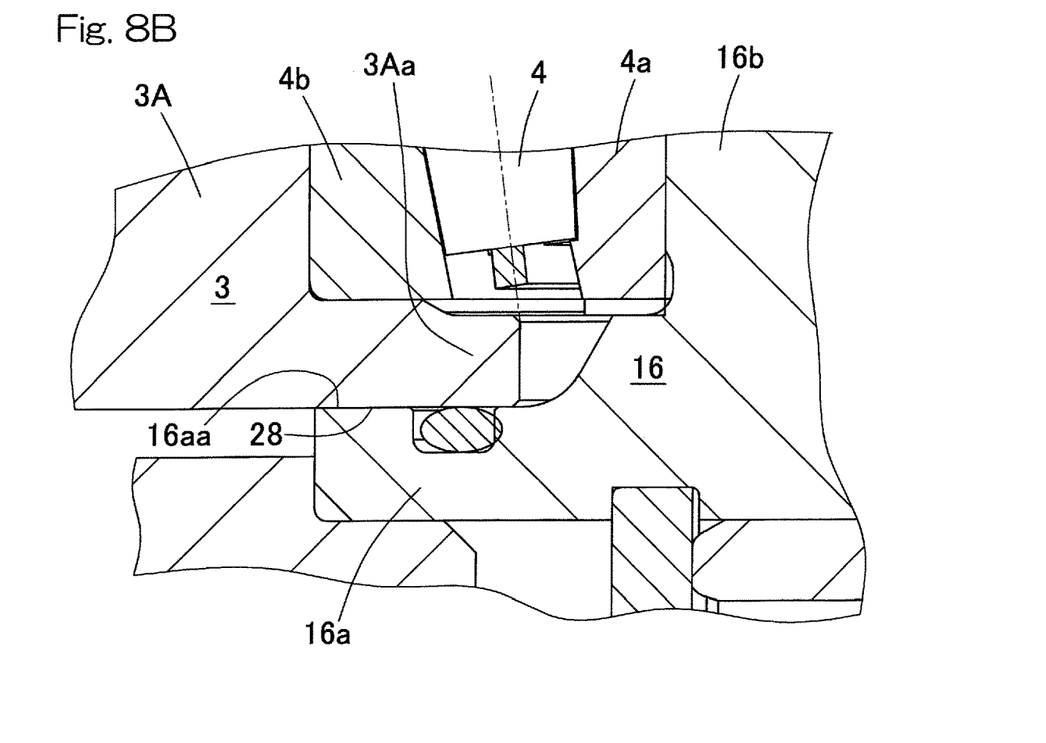
FIG. 8B is an enlarged section view of the periphery of the abutment part in an abutment state.

FIG. 7 is an enlarged section view (section VII in FIG. 1) of a turning shaft part and the like of the turning function-equipped hub unit 1. As shown in FIGS. 7 and 8, the unit support member 3 includes an abutment part 28 which is separated from the annular part 16a of the outer ring 16 of the hub unit main body 2 in the vertical direction during a normal time (FIG. 8A) and with which the annular part 16a of the outer ring 16 comes into abutment in the vertical direction during non-normal time (FIG. 8B). The term "non-normal time" means a time when an impact load equal to or greater than a predetermined value acts on the hub unit main body 2 in the vertical direction due to an external force from the wheel 9 (FIG. 1).

The impact load equal to or greater than a predetermined value may be any impact load arbitrarily defined in accordance with designs or the like and, for example, may be defined by calculating an appropriate impact load by one or both of testing and simulation. The following are examples of a time when an impact load equal to or greater than a predetermined value acts on the hub unit main body 2 in the vertical direction due to an external force from the wheel:

(1) when a wheel hits an object on the road (e.g., when a vehicle drives up a curbstone during normal travel); and (2) when a damping device of a vehicle cannot absorb a force acting on a ground contact surface of a tire of a wheel in a transverse direction to a direction of vehicle travel during turning of the vehicle. This is because, in this case, the force is more likely to be transferred as a larger moment force to the hub unit. The moment force is a moment force (FIG. 1: arrow B) that acts on the hub unit about a direction of vehicle travel.

The annular part 16a of the outer ring 16 has an outer peripheral surface that serves as a to-be-contacted surface 16aa configured to be brought into surface contact with a contact surface of the abutment part 28. The abutment part 28 refers to a part of each fitting hole forming part 3Aa of the unit support member main body 3A, which is opposed to the outer peripheral surface of the annular part 16a via a minute gap δ, and to a part of the unit support member joint body 3B, which is opposed to the outer peripheral surface of the annular part 16a via a minute gap δ.

Even where an excessive external force from the road surface acts on the hub bearing 15 in an impulse-like manner, the abutment part 28 of the unit support member 3 and the annular part 16a of the outer ring 16 come into direct abutment when deformation of the attachment shaft part 16b of the turning shaft exceeds a certain extent, so as to temporarily stop the turning function and receive the excessive external force on the abutment part 28. This makes it possible to suppress generation of excessive stress to the turning shaft parts 16b and to prevent a load equal to or greater than a predetermined amount from acting on the rotation allowing support components 4 that support the turning shaft parts 16b so as to protect the turning shaft parts 16b and the rotation allowing support components 4.

The gap δ between the unit support member 3 and the outer ring 16 is preferably set to a range in which stress generated to the turning shaft part 16b falls within a range of elastic deformation and in which no indentation occurs on the raceway surfaces of the inner and outer races 4a, 4b, when the two members 3, 16 are brought into abutment due to an excessive impulse force.

In contrast, a conventional structure shown in FIG. 10 does not include an "abutment part" which is characteristic to the present invention and has a structure in which all of an excessive impact force acts on a turning shaft part Tg and a support bearing Brg for the turning shaft part. Therefore, abnormality may occur such as, for example, plastic deformation of the turning shaft part Tg or indentation on the raceway surface of the support bearing Brg, possibly degrading the turning function.

Turning Actuator 5

As shown in FIG. 3, the turning actuator 5 includes an actuator main body 7 configured to rotationally drive the hub unit main body 2 about the turning axis A (FIG. 1). As shown in FIG. 2, the actuator main body 7 includes a motor 26, a speed reducer 27 configured to reduce the speed of rotation of the motor 26, and a linear motion mechanism 25 configured to convert a forward and reverse rotation output from the speed reducer 27 into a reciprocating linear motion of the linear output part 25a. The motor 26 is, for example, a permanent magnet synchronous motor, or may be a direct current motor or an induction motor.

The speed reducer 27 may be a winding-type transmission mechanism, such as a belt transmission mechanism, or a gear train. In the example of FIG. 2, a belt transmission mechanism is used. The speed reducer 27 includes a driving pulley 27a, a driven pulley 27b, and a belt 27c. The driving pulley 27a is coupled to a motor shaft of the motor 26, and the driven pulley 27b is disposed in the linear motion mechanism 25. The driven pulley 27b is disposed in parallel with the motor shaft. A driving force of the motor 26 is transmitted from the driving pulley 27a to the driven pulley 27b through the belt 27c. The driving pulley 27a, the driven pulley 27b and the belt 27c form the speed reducer 27 of a winding type.

The linear motion mechanism 25 may be a feed screw mechanism, such as a sliding screw and a ball screw, or a rack and pinion mechanism. In this example, a feed screw mechanism with a trapezoid sliding screw is used. Since the linear motion mechanism 25 includes the feed screw mechanism with the trapezoid sliding screw, the effects of preventing reverse input from the tire 9b can be enhanced. The actuator main body 7 including the motor 26, the speed reducer 27 and the linear motion mechanism 25 is assembled as a semi-assembled product and is removably mounted to a casing 6b by e.g. a bolt. It is also possible to use a mechanism that directly transmits a driving force from the motor 26 to the linear motion mechanism 25 without involving a speed reducer.

The casing 6b is integrally formed with the unit support member main body 3A as a part of the unit support member 3. The casing 6b is formed in a bottomed cylindrical shape and includes a motor receiving part for supporting the motor 26 and a linear motion mechanism receiving part for supporting the linear motion mechanism 25. The motor receiving part is formed with a fitting hole for supporting the motor 26 at a predetermined position inside the casing. The linear motion mechanism receiving part is formed with a fitting hole for supporting the linear motion mechanism 25 at a predetermined position inside the casing and a through-hole for allowing the linear output part 25a to advance and retreat.

As shown in FIG. 3, the unit support member main body 3A includes: the casing 6b; a shock absorber attachment part 6c that serves as an attachment part for a shock absorber; and a steering device joint part 6d that serves as a joint part for the steering device 11 (FIG. 2). The shock absorber attachment part 6c and the steering device joint part 6d are also integrally formed with the unit support member main body 3A. The shock absorber attachment part 6c is formed in a protruding manner on an upper portion of an outer surface part of the unit support member main body 3A. The steering device joint part 6d is formed in a protruding manner on a side surface portion of the outer surface part of the unit support member main body 3A.

Effects and Advantages

According to the above-described turning function-equipped hub unit 1, as shown in FIG. 1, the hub unit main body 2 including the hub bearing 15 for supporting the wheel 9 can be freely rotated about the turning axis A by driving the actuator main body 7. That is, as shown in FIG. 2, the hub unit main body 2 can be rotated through the supplementary turning force receiving part 17 coupled to the linear output part 25a, by driving the motor 26 to cause the linear output part 25a of the turning actuator 5 to advance and retreat.

This rotation is performed as supplementary turning in addition to turning in accordance with an operation of the steering wheel by a driver, i.e., in addition to rotation of the knuckle 6 about the king pin axis caused by the steering device 11, and makes it possible to independently turn a single wheel. By changing angles of supplementary turning of the left and right wheels 9, 9, it is possible to arbitrarily change toe angles of the left and right wheels 9, 9.

Therefore, the hub unit may be used in either turning wheels (such as front wheels) or non-turning wheels (such as rear wheels). Where the hub units are used in turning wheels, each hub unit is disposed in a component whose direction is changed by the steering device 11 such that the hub unit serves as a mechanism for causing a minute change in the angle of the wheel 9 to move the left and right wheels in an independent manner or in an interlocking manner, in addition to turning in accordance with an operation of the steering wheel by a driver. Sufficient supplementary turning can be achieved by turning the wheels by a minute angle in order to improve motion performance of a vehicle and improve travel stability and reliability, and a supplementarily turnable angle of ±5 degree or less may be still sufficient. The angle of supplementary turning may be obtained by controlling the turning actuator 5.

Also, it is possible to vary a difference in turning angles of the left and right wheels in accordance with a travel speed while turning. For example, it is possible to change the steering geometries while driving so as to assume parallel geometry when turning in a high-speed range and Ackermann geometry when turning in a low-speed range. Thus, since the wheel angle can be arbitrarily changed while driving, it is possible to improve motion performance of a vehicle and to drive stably and more reliably. Further, it is also possible to reduce a turning radius of a vehicle to enhance small-turn performance by appropriately changing turning angles of the left and right turning wheels when turning.

In addition, it is possible to make adjustments to ensure travel stability while reducing travel resistance without deteriorating fuel economy, by adjusting the magnitude of a toe angle according to circumstances even when the vehicle is traveling linearly. Further, even where an abnormality occurs in the function of a power source for the turning function-equipped hub unit 1 while driving, the vehicle can be moved to a safe place to park by operating the steering wheel, making it possible to ensure reliability.

During normal time, the abutment part 28 of the unit support member 3 is separated from the annular part 16a of the outer ring 16 in the vertical direction and thus does not inhibit rotation (i.e. turning function) about the turning axis A of the hub unit main body 2.

During non-normal time in which an impact load equal to or greater than a predetermined value acts on the hub unit main body 2 in the vertical direction due to an external force from the wheel, the annular part 16a of the outer ring 16 (a part of the hub unit main body 2) is brought into direct abutment with the abutment part 28 of the unit support member 3 in the vertical direction so as to temporarily stop the turning function and receive the excessive external force on the abutment part 28. This makes it possible to suppress generation of large stress to the attachment shaft part 16b so as to prevent abnormality, such as deformation, from occurring to the attachment shaft part 16b. Also, it is possible to prevent indentation from occurring on the raceway surfaces of the inner and outer races 4a, 4b of the rolling bearing for supporting the attachment shaft part 16b in advance to maintain a good turning function during normal time. Therefore, it is possible to reduce the size of the turning function-equipped hub unit 1 without making it excessively large. Further, it is possible to more reliably suppress concentration of stress on the unit support member 3 and the hub unit main body 2 by bringing the abutment part 28 of the unit support member 3 and the part of the hub unit main body 2 into surface contact with each other.

Another Embodiment

In the following description, features corresponding to those described in the above embodiments are denoted by like reference numerals, and overlapping description is omitted. Where description is made only to a part of a feature, the rest of the feature is the same as the configuration described previously, unless otherwise specifically described. Like features provide like effects and advantages. Combination is not limited to those of the parts specifically described in the embodiments, and the embodiments may be partly combined as long as such combination causes no hinderance.

In the first embodiment, as shown in FIG. 2, the actuator main body 7 is substantially entirely covered by the casing 6b. However, the configuration is not limited to this example. As another embodiment, for example, a so-called external mount structure may be employed in which the motor 26 of the actuator main body 7 is mounted on an external surface of the casing 6b and is exposed from the casing 6b. In this case, it is possible to use a ready-made motor and also to easily replace the motor, enhancing ease of maintenance. As another embodiment, the unit support member 3 may be separately formed from the chassis frame component, and the unit support member 3 may be removably mounted to the chassis frame component.

Turning System

As shown in FIG. 3, the turning system includes: a turning function-equipped hub unit 1 according to any one of the above embodiments; and a controller 29 configured to control a turning actuator 5 of the turning function-equipped hub unit 1. The controller 29 includes a control section 30 and an actuator drive and control section 31. The control section 30 is configured to output a current command signal S2 in accordance with a supplementary turning angle command signal (turning angle command signal) S1 given from a higher-order control section 32.

The higher-order control section 32 is a higher-order control section of the control section 30, and the higher-order control section 32 may be, for example, an electric control section (vehicle control section, or abbreviated as VCU) for general control of a vehicle. The actuator drive and control section 31 is configured to output drive current C1 in accordance with a current command signal S2 output from the control section 30 to drive and control the turning actuator 5. The actuator drive and control section 31 is configured to control power supplied to coils of the motor 26. The actuator drive and control section 31 constitutes, for example, a half bridge circuit with non-illustrated switching elements and performs PWM control to determine a motor application voltage in accordance with an ON-OFF duty ratio of the switching elements. This makes it possible to finely cause a change in the angle of the wheel in addition to turning in accordance with an operation of the steering wheel by a driver. It is also possible to adjust the magnitude of a toe angle according to circumstances even when the vehicle is traveling linearly.

Although the preferred embodiments of the present invention have been described with reference to the drawings, those skilled in the art who read this description would readily arrive at various changes and modifications without departing from the scope of the invention. Accordingly, such changes and modifications should also be included within the scope of the present invention, which is defined by the appended claims.

REFERENCE NUMERALS

1 . . . Turning function-equipped hub unit
2 . . . Hub bearing
3 . . . Unit support member
5 . . . Turning actuator
9 . . . Wheel
15 . . . Hub bearing
16aa . . . To-be-contacted surface
28 . . . abutment part
29 . . . Controller
30 . . . Control section
31 . . . Actuator drive and control section

What is claimed is:

1. A turning function-equipped hub unit comprising:
a hub unit main body including a hub bearing configured to support a wheel;
a unit support member configured to be provided to a chassis frame component of a suspension device, the unit support member supporting the hub unit main body so as to be rotatable about a turning axis extending in a vertical direction; and
a turning actuator configured to rotationally drive the hub unit main body about the turning axis,
wherein the unit support member includes an abutment part configured such that a part of the hub unit main body is brought into abutment with the abutment part in the vertical direction during a non-normal time, the non-normal time in which the abutment is caused being defined as a time when an impact load equal to or greater than a predetermined value acts on the hub unit main body in the vertical direction due to an external force from the wheel, and the abutment part is separated from the hub unit main body in the vertical direction during normal time.

2. The turning function-equipped hub unit as claimed in claim 1, wherein the part of the hub unit main body forms a to-be-contacted surface configured to be brought into surface contact with a contact surface of the abutment part.

3. The turning function-equipped hub unit as claimed in claim 1, comprising a rotation allowing support component configured to allow the hub unit main body to rotate about the turning axis with respect to the unit support member.

4. The turning function-equipped hub unit as claimed in claim 3, wherein the hub unit main body includes an outer ring, said outer ring having an annular part that fixed to an outer peripheral surface of an outer race that is a stationary ring of the hub bearing; and attachment shaft parts protruding upward and downward from an outer periphery of the annular part, each of the attachment shaft parts being attached with the rotation allowing support component, and
the annular part of the outer ring is the part of the hub unit main body which is configured to be brought into abutment with the abutment part.

5. A turning system comprising:
a turning function-equipped hub unit as claimed in claim 1; and
a controller configured to control a turning actuator of the turning function-equipped hub unit, wherein
the controller includes: a control section configured to output a current command signal in accordance with a given turning angle command signal; and an actuator drive and control section configured to output current in accordance with the current command signal inputted from the control section to drive and control the turning actuator.

6. A vehicle comprising: turning function-equipped hub units as claimed in claim 1, wherein the turning function-equipped hub units support one or both of front wheels and rear wheels.

* * * * *